(12) United States Patent
Coyle (10) Patent No.: US 12,440,659 B2
(45) Date of Patent: Oct. 14, 2025

(54) DUAL ENDED DISINFECTING CAP FOR STOPCOCK VALVES

(71) Applicant: Becton, Dickinson and Company, Franklin Lakes, NJ (US)

(72) Inventor: Sean Coyle, Pennington, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 874 days.

(21) Appl. No.: 17/297,021

(22) PCT Filed: Nov. 26, 2019

(86) PCT No.: PCT/US2019/063217
§ 371 (c)(1),
(2) Date: May 26, 2021

(87) PCT Pub. No.: WO2020/112749
PCT Pub. Date: Jun. 4, 2020

(65) Prior Publication Data
US 2022/0023609 A1    Jan. 27, 2022

Related U.S. Application Data

(60) Provisional application No. 62/773,568, filed on Nov. 30, 2018.

(51) Int. Cl.
*A61M 39/16*    (2006.01)
*A61M 39/02*    (2006.01)
(Continued)

(52) U.S. Cl.
CPC .......... *A61M 39/162* (2013.01); *A61M 39/20* (2013.01); *A61M 2039/0258* (2013.01);
(Continued)

(58) Field of Classification Search
CPC ................ A61M 39/162; A61M 39/20; A61M 2039/1038
See application file for complete search history.

(56) References Cited

U.S. PATENT DOCUMENTS 3,987,930 A    10/1976 Fuson
8,641,681 B2    2/2014 Solomon et al.
(Continued)

FOREIGN PATENT DOCUMENTS

JP    2016511111    4/2016
WO    WO-0123026 A1    4/2001
(Continued)

*Primary Examiner* — Bradley J Osinski
(74) *Attorney, Agent, or Firm* — Dickinson Wright PLLC (57) ABSTRACT

A universal cap for both male and female connections includes configuration of structural elements allowing the cap to be opened at either end. Optionally, an inner wall feature allows each end of a cap structure to function as its own cap, or perform a separate capping function. For example, should one end of the cap structure be in use, and the other end of the cap structure be open to air, the end of the cap structure in use, or performing the capping function, is not compromised. Optionally, dual ended cap structure includes features designed to maintain the pressure in a closed system, for both the male and female luer lock ends.

20 Claims, 7 Drawing Sheets

(51) Int. Cl.
*A61M 39/10* (2006.01)
*A61M 39/20* (2006.01)
*A61M 39/22* (2006.01)

(52) U.S. Cl.
CPC ............... *A61M 2039/1038* (2013.01); *A61M 2039/229* (2013.01)

(56) References Cited

U.S. PATENT DOCUMENTS

| | | |
|---|---|---|
| 9,867,975 B2 | 1/2018 | Gardner et al. |
| 2007/0093762 A1 | 4/2007 | Utterberg et al. |
| 2012/0022469 A1* | 1/2012 | Alpert .................. A61M 39/16 604/533 |
| 2012/0039764 A1* | 2/2012 | Solomon .................. A61L 2/18 422/292 |
| 2012/0302997 A1* | 11/2012 | Gardner ................ A61M 39/20 604/533 |
| 2014/0248182 A1 | 9/2014 | Solomon et al. |
| 2016/0015931 A1 | 1/2016 | Ryan et al. |

FOREIGN PATENT DOCUMENTS

| | | |
|---|---|---|
| WO | WO-2008043016 A2 | 4/2008 |
| WO | WO-2014159346 A1 | 10/2014 |
| WO | WO-2017070098 A1 | 4/2017 |
| WO | WO-2018071717 A1 | 4/2018 |
| WO | WO-2018106508 A1 | 6/2018 |

\* cited by examiner

DUAL ENDED DISINFECTING CAP FOR STOPCOCK VALVES

CROSS-REFERENCE TO RELATED APPLICATIONS

This application claim priority under 35 USC § 119(e) from U.S. Provisional Patent Application No. 62/773,568 filed on Nov. 30, 2018, the contents of which (including all attachments filed therewith) are hereby incorporated by reference in their entirety.

TECHNICAL FIELD

Generally, exemplary embodiments of the present disclosure relate to the fields of threaded fittings, including medical caps and medical disinfection caps, and in particular caps and/or disinfection caps for uses with stopcocks, such as a valve or turning plug that controls the flow of fluid from a container through a tube such as IV tubing.

BACKGROUND

Figure 1A:
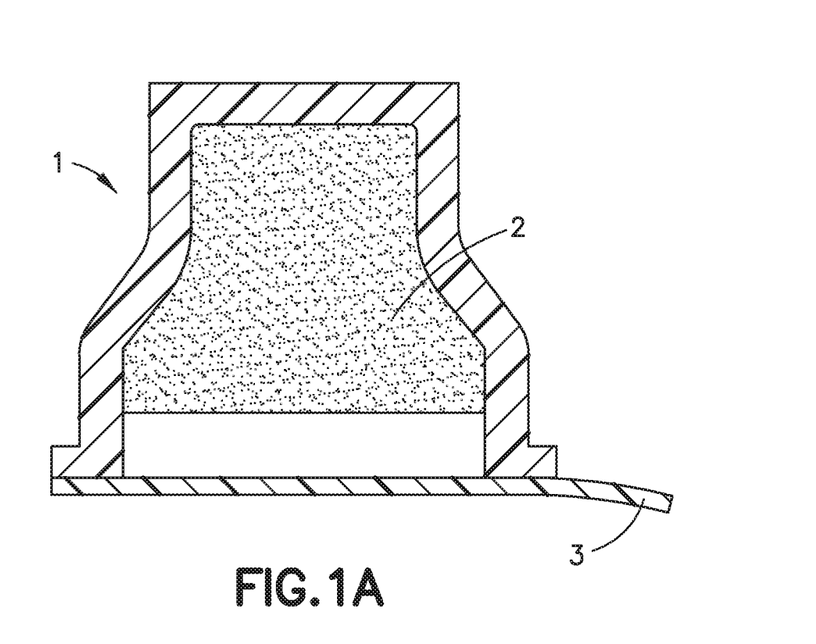
FIGS. 1A and 1B are cross sectional views of conventional caps for needleless connectors.
Figure 1B:
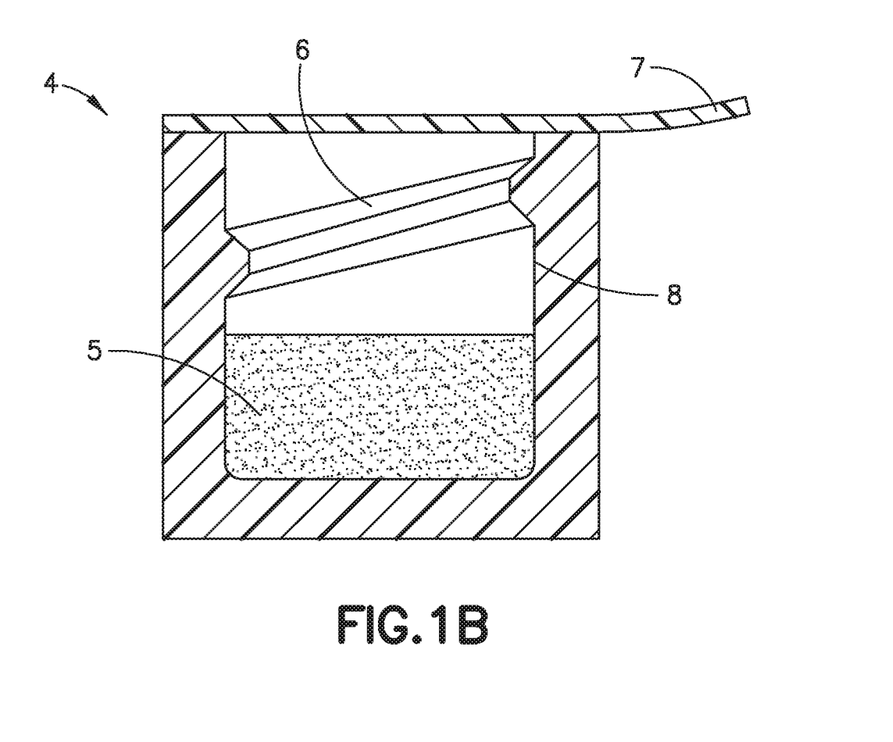

In the example of medical applications, various conventional caps for closing off a needleless connector while not in use have been known for some time. In order to decrease Catheter-related bloodstream infection (CRBSI) cases disinfection caps were originally disclosed in U.S. Patent Publication No. 2007/011233 which issued as U.S. Pat. No. 8,740,864 (the entire disclosures of both of which are incorporated herein by reference), and introduced on the market. Disinfection caps such as those disclosed in the U.S. Pat. No. 8,740,864 are illustrated in FIGS. 1A and 1B herein, where cap 1 includes a disinfecting pad 2 and a lid 3, and cap 4 includes a disinfecting pad 5 and lid 7, as well as threads 6 on its inner circumference 8 to interlock with needleless connector hub. On the other hand, other conventional caps may have similar features but exclude the disinfecting pad. Further improved designs for disinfection caps are disclosed in related U.S. patent application Ser. Nos. 15/408,278 and 15/408,187, both filed on Jan. 17, 2017 (the entire disclosures of both of which are incorporated herein by reference). Yet further modifications to cap designs adding further safety considerations are disclosed in related U.S. Patent Applications Nos. 62/488,266, filed on Apr. 21, 2017, 62/523,506, filed Jun. 22, 2017, and 62/623,858 filed Jan. 30, 2018 (the entire disclosures of which are incorporated herein by reference).

Figure 2A:
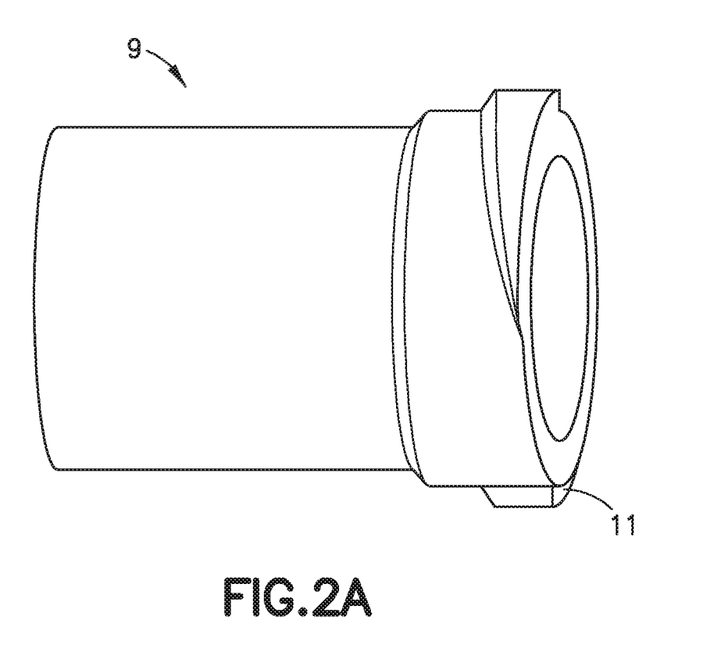
FIGS. 2A and 2B are side-isometric and end views, respectively, of conventional male tip caps.
Figure 2B:
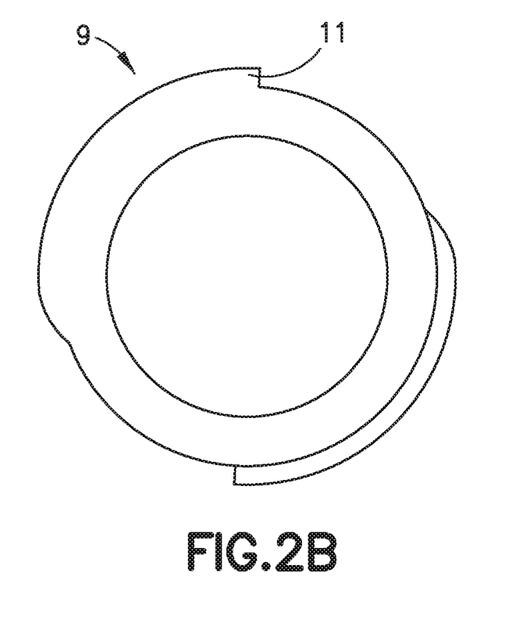
Figure 3:
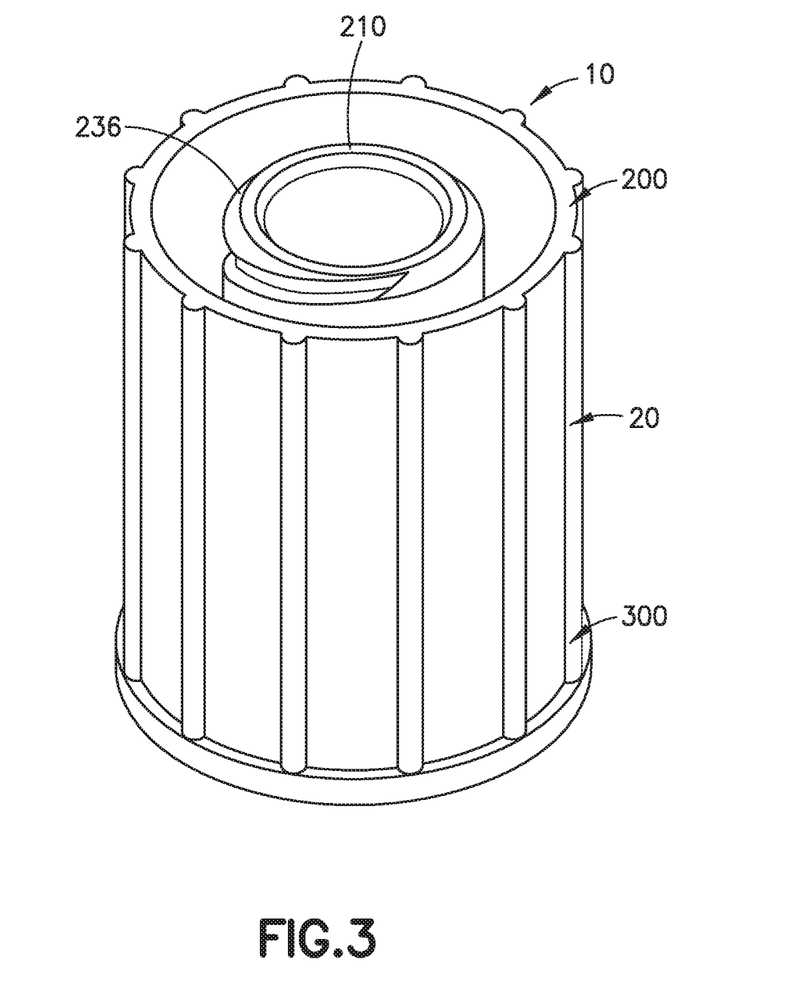
FIG. 3 illustrates an isometric or perspective view of a dual cap structure according to exemplary embodiments of the disclosure

Currently, there are male disinfecting cap devices for disinfecting ISO594-2 type of female threaded fluid luer connectors and there are female disinfecting cap devices for disinfecting ISO594-2 type of male threaded fluid luer connectors. Also, as illustrated in FIGS. 2A and 2B, there are known caps 9, or male tip disinfecting caps, having threads 11 which do not completely encircle a tip hub. Such caps with partial threads can be prone to leakage, for example in stopcock applications when pressure is applied.

Accordingly, there is not a singular universal cap, or disinfecting cap, device designed to be selectively opened at either end, or both ends, allowing it to interface with either a male or female type of connectors, or to be a universal cap for both male and female stopcock connections, and where a male side of the cap can prevent leakage and better maintain pressure in a stopcock system.

SUMMARY

The matters exemplified in this description are provided to assist in a comprehensive understanding of exemplary embodiments of the disclosure. Accordingly, those of ordinary skill in the art will recognize that various changes and modifications of the embodiments described herein can be made without departing from the scope and spirit of the disclosure. Also, descriptions of well-known functions and constructions are omitted for clarity and conciseness.

As would be readily appreciated by skilled artisans in the relevant art, while descriptive terms such as "lock", "hole", "tip", "hub", "thread", "sponge", "protrusion", "tab", "slope", "wall", "top". "side", "bottom," "upper," "lower," "stopcock" and others are used throughout this specification to facilitate understanding, it is not intended to limit any components that can be used in combinations or individually to implement various aspects of the embodiments of the present disclosure.

Exemplary embodiments of the present disclosure provide dual ended disinfecting cap, which can be used with open female luer and male connections found on stopcock valves.

In an exemplary implementation of the embodiments of present disclosure, a cap, a connector cap, or a disinfecting cap includes integrated thread, or threads, and other features in any and all combinations allowing it to interface with both male and female threaded fittings.

According to exemplary implementations of the embodiments of the present disclosure, configuration of structural elements making up the cap allow the cap to be opened at either end, to allow the cap to be a universal cap for both male and female stopcock connections.

Optionally, according to yet further exemplary implementations of the embodiments of the present disclosure, an inner wall feature allows each end of a cap structure to function as its own cap, or perform a separate capping function. For example, should one end of the cap structure be in use, and the other end of the cap structure be open to air, the end of the cap structure in use, or performing the capping function, will not be compromised.

Optionally, according to still further exemplary implementations of the embodiments of the present disclosure, a dual ended cap structure includes features designed to maintain the pressure in a closed system, for both the male and female luer lock ends. For example, in an end of a cap structure configured for capping a female luer lock end, a male mating feature can be provided designed to maintain pressure in a stopcock closed system. In yet further example, another end of a cap structure configured for capping a male luer lock end can be provided with threads designed to maintain pressure and provide a seal on a luer lock syringe. Any combination of such exemplary features can be provided on one or both ends of a dual ended cap structure of the present disclosure.

Optionally, according to still further exemplary implementations of the embodiments of the present disclosure, a dual ended cap structure includes features designed to disinfect a stopcock from bacteria for example by providing a cleaning member or a cleaning solution in one or both ends of the cap structure.

Optionally, according to still further exemplary implementations of the embodiments of the present disclosure, an end of a cap structure configured for capping a male luer lock end can be provided with a wall around the luer connection.

Optionally, according to still further exemplary implementations of the embodiments of the present disclosure, an end of a cap structure configured for capping a male luer lock end can be provided with threads such as those of a tip cap design of Becton, Dickinson and Company PosiFlush™ syringes, which are designed for example to maintain pressure to keep fluid from evaporating during autoclave of the product.

BRIEF DESCRIPTION OF THE DRAWINGS

Referring now to the drawings, wherein like reference numerals designate identical or corresponding parts throughout the several views, embodiments of the present disclosure are described as follows.

DETAILED DESCRIPTION OF THE EXEMPLARY EMBODIMENTS

This matters exemplified in this description are provided to assist with a comprehensive understanding of exemplary embodiments with reference to the accompanying drawing figures. Accordingly, those of ordinary skill in the art will recognize that various changes and modifications of the exemplary embodiments described herein can be made within the scope of appended claims without departing from their full scope and equivalents. Also, descriptions of well-known functions and constructions are omitted for clarity and conciseness. Likewise, certain naming conventions, labels and terms as used in the context of the present disclosure are non-limiting and provided only for illustrative purposes to facilitate understanding of exemplary implementations of the exemplary embodiments.

Referring to FIGS. 3 through 7, according to exemplary embodiments of the present disclosure a dual cap structure 10 comprises a housing 20 including a male luer capping portion 200, which can receive, accommodate and/or engage a male needleless connector 80, and a female luer capping portion 300, which can receive, accommodate and/or engage a female needleless connector 70, and a wall 22, such as an interior separation wall, disposed with the housing 20 between, and/or to separate, portions 200 and 300.

Figure 4:
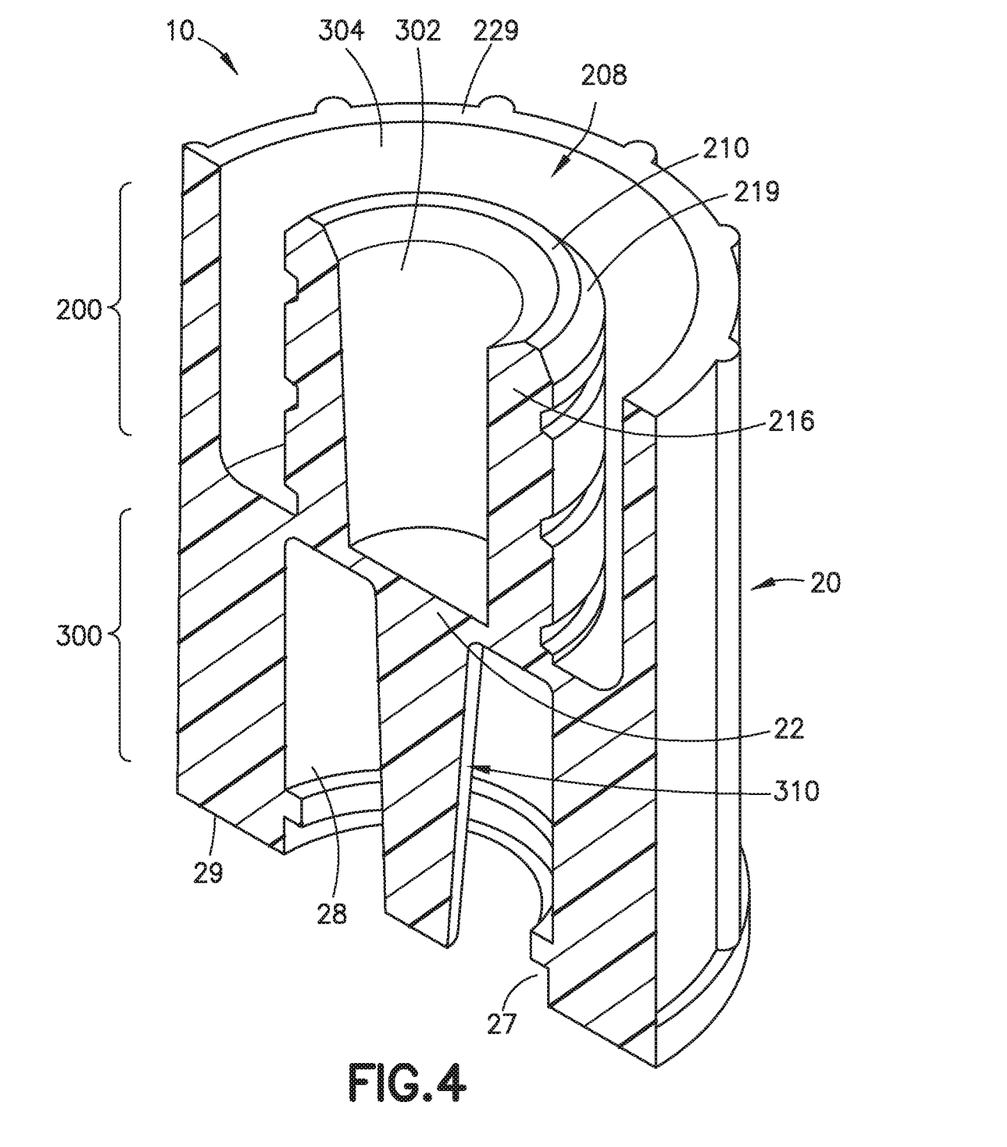
FIG. 4 illustrates an isometric split, or cross sectional, view of a cap according to exemplary embodiments of the disclosure.
Figure 5A:
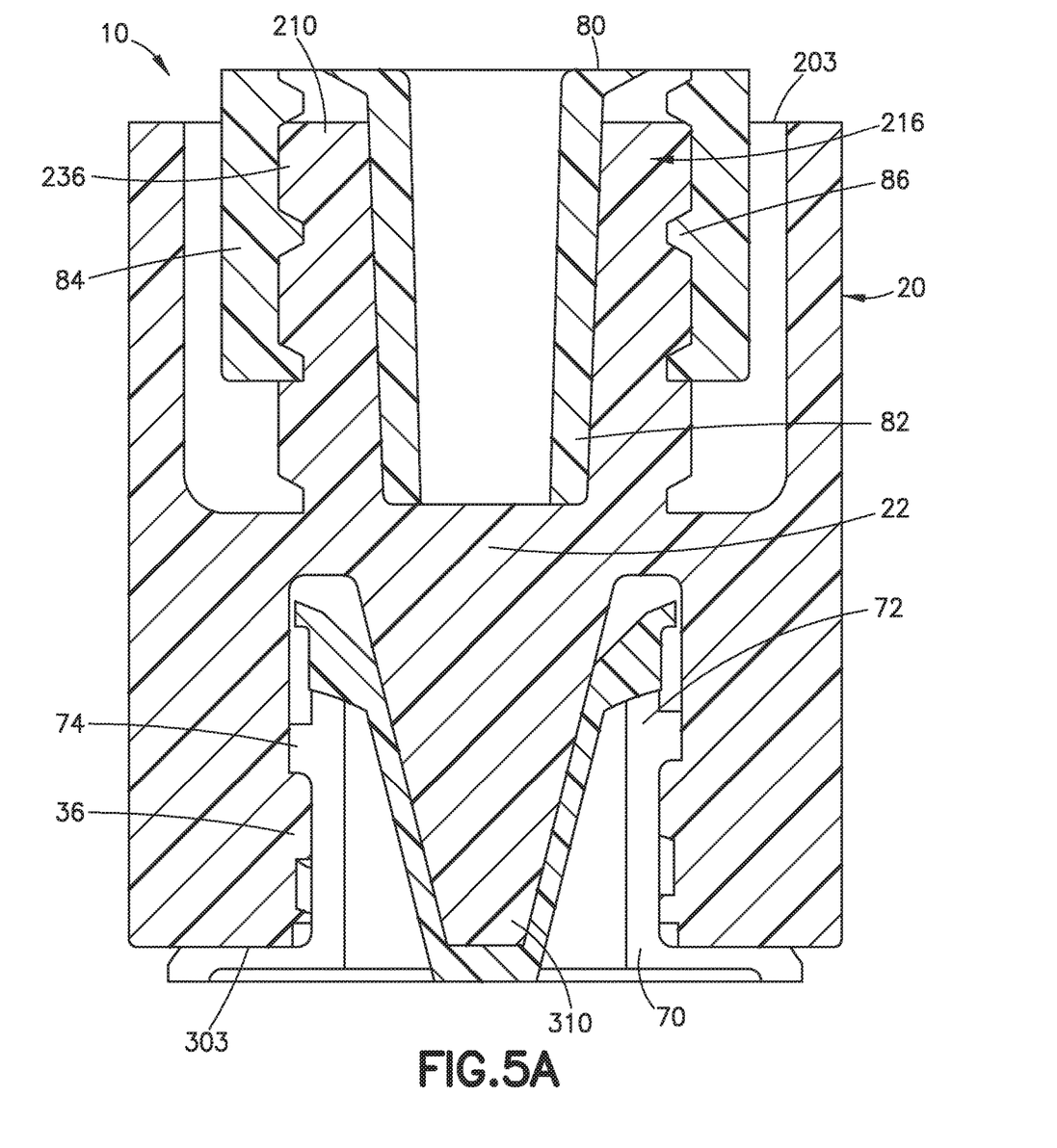
FIGS. 5A, 5B and 5C diagrammatically show a cross sectional view of a cap shown in FIGS. 3A and 3B assembled, according to exemplary embodiments of the disclosure, to a male component and/or a female component.
Figure 5B:
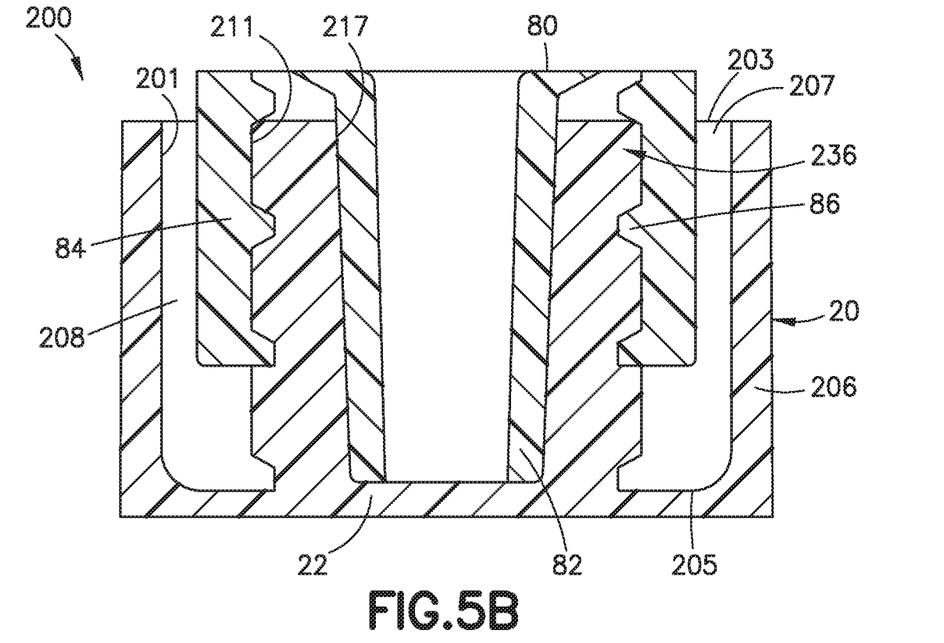

Referring to FIGS. 4, 5A and 5B, in an exemplary implementation, a male luer capping portion 200 comprises an inner surface 205, a sidewall portion 206 (which can be essentially cylindrical) of housing 20 with an inner surface 201, and an opening 207 into a cavity 208. Opening 207 is disposed at an end 203 of housing 20. Inner surface 205 of wall 22 can form a bottom of cavity 208. Disposed within cavity 208 is a protrusion 210 (which can be essentially cylindrical, extending from inner surface 205 and coaxial with sidewall 206) having an outer surface 211 configured for mating with male luer end 80. Protrusion 210 surrounds and/or defines an inner portion 302 of cavity 208, and defines an outer portion 304 and of cavity 208. Inner portion 302 comprises an opening 217 for receiving or accommodating a tip or hub 82 of a male needleless connector 80 in the inner portion 302. For example, protrusion 210 comprises a wall 216 having thread or protrusion 236 on its outer surface 211 for engaging an inner thread or protrusion 86 on collar 84 of connector 80.

Figure 5C:
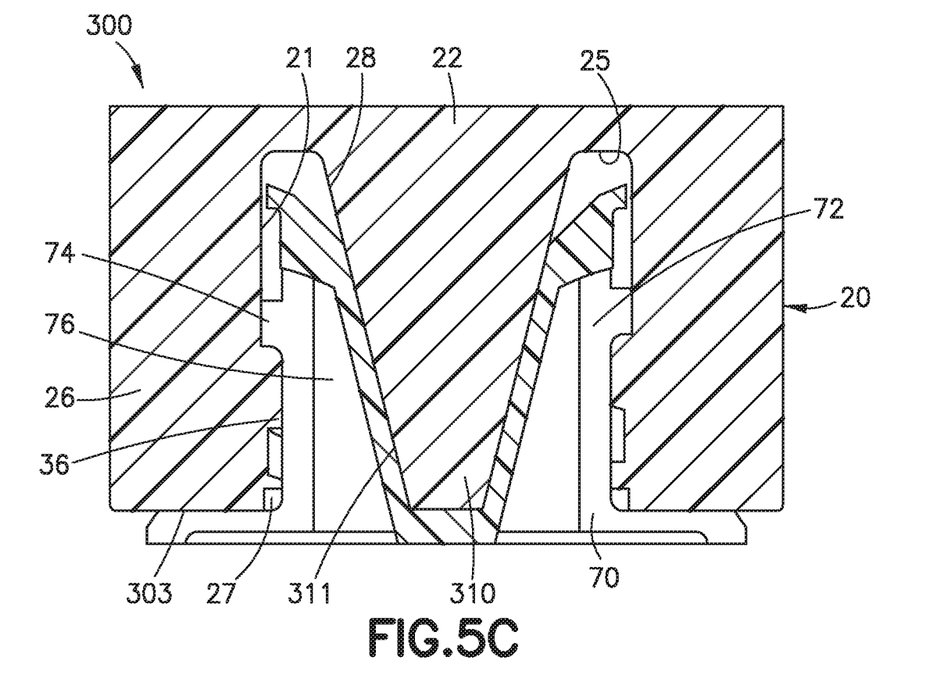
Figure 6:
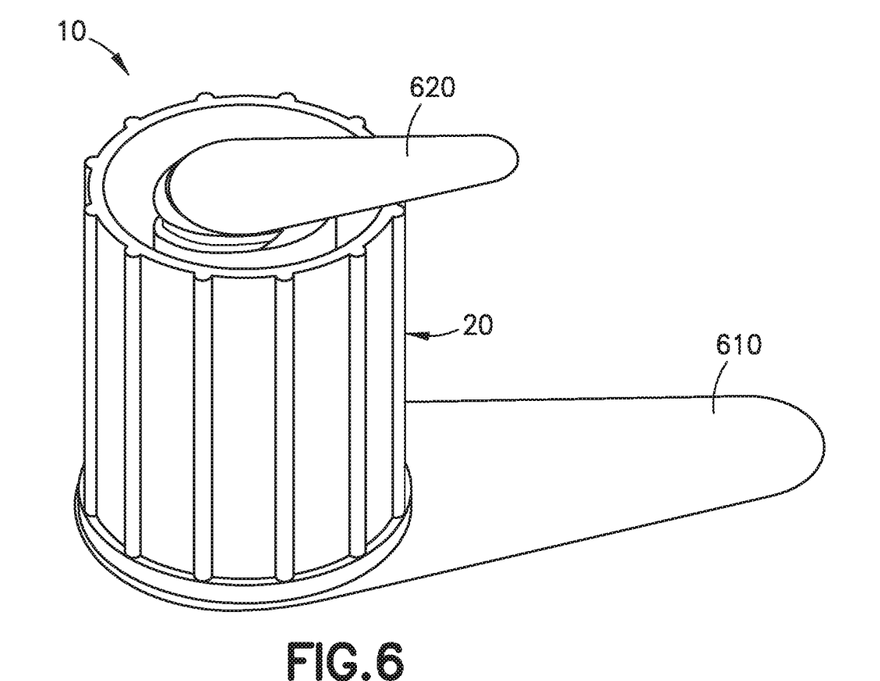
FIG. 6 illustrates isometric views of a dual cap structure including covers, such as a peel strip, according to exemplary embodiments of the disclosure.

Referring to FIGS. 4, 5A and 5C, in an exemplary implementation, a female luer capping portion 300 comprises an inner surface 25, a sidewall portion 26 (which can be essentially cylindrical) of housing 20 with an inner surface 21, and an opening 27 into a cavity 28. Opening 27 is disposed at an end 303 of housing 20. Inner surface 25 of wall 22 can form a top of cavity 28. Disposed within cavity 28 is a protrusion 310 (which can be essentially cylindrical, or frustoconical, extending from inner surface 25 and coaxial with sidewall 26) having an outer surface 311 configured for extending into, or mating with, female open luer end 76. Sidewall portion 26 comprises an inner thread or protrusion 36 on its inner surface 21 for engaging an outer thread or protrusion 74 of female connector 70.

Referring to FIGS. 4, 5A, 5B, 5C, and 6, in an exemplary implementation, a peel sealing film 610 can be provided to seal the opening 27 prior to use of cap 10, for example, by attachment to a surface of a rim 29 of an open end 303 of female luer capping portion 300, as described for example in the above-referenced prior applications. In yet another exemplary implementation, a peel sealing film 620 can be provided to seal the opening 217 of inner portion 302 prior to use of cap 10, for example, by attachment to a surface of a rim 219 of protrusion 210 of male luer capping portion 200. In yet further exemplary implementation, a peel sealing film (not shown) can be provided to seal the opening 207 prior to use of cap 10, for example, by attachment to a surface of a rim 229 of side wall 206 of male luer capping portion 200 in the same manner as attachment of sealing film 610 for sealing the opening 27.

Figure 7:
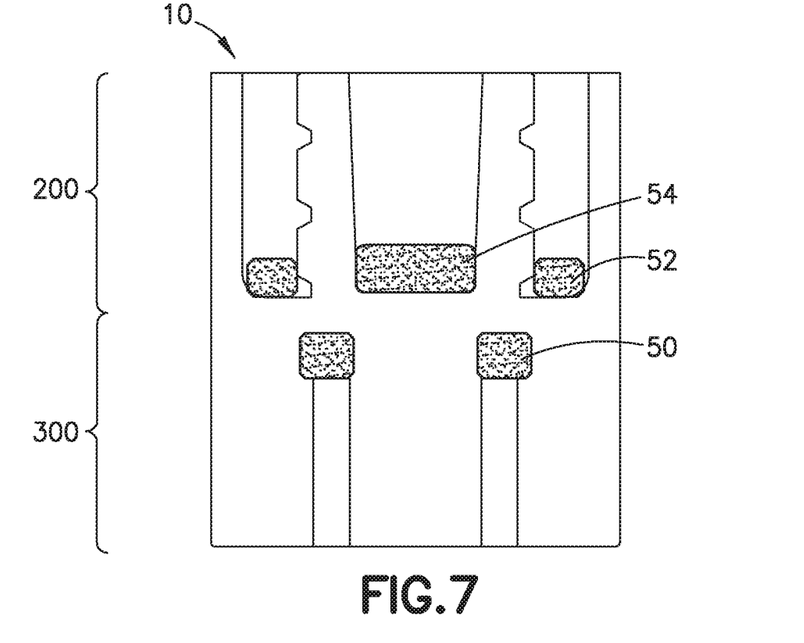
FIG. 7 diagrammatically shows a cross sectional view of a dual cap structure including cleaning or disinfection components according to exemplary implementations of embodiments of the disclosure.

In yet another exemplary implementation, a disinfecting member or members, such as an IPA soaked sponge 50 and/or sponge 52 and/or sponge 45, can be provided within cavity 28, for example in the proximity of inner surface 25 of wall 22, and/or within cavity 208, for example in the proximity of inner surface 205 with portion 302 and/or within portion 304, as illustrated in FIG. 7, for example as described in the above-referenced prior applications.

In yet another exemplary implementation, protrusion 210 can extend essentially from inner surface 205 of wall 22 toward open end 203 housing 20.

In still further exemplary implementation, protrusion 210 can extend essentially parallel to sidewall 206.

Referring to FIGS. 3 through 7, according to exemplary embodiments of the disclosure, cap 10 can receive a tip or hub 72 of a female needleless connector 70, for example after a peel sealing film 610 sealing cavity 28 is removed or when the peel sealing film 610 is pierced, within cavity 28 and secure (for example, threadedly) the tip of needleless connector 70 within cavity 28. One or more threads 36 can be sufficient to interlock with a mating feature 74 (such as one or more protrusions, lugs and/or thread) of a hub or tip 72 of needleless connector 70, as described for example in related U.S. patent application Ser. Nos. 15/408,278 and 15/408,187, both filed on Jan. 17, 2017

Referring further to FIGS. 3 through 7, according to exemplary embodiments of the disclosure, cap 10 can receive a tip or hub 82 of a male needleless connector 80, for example after a peel sealing film sealing cavity 208, or peel 620 sealing the opening 217 of inner portion 302, is removed or when the peel sealing film is pierced, within inner portion 302 of cavity 208 and secure the tip or hub 82 of needleless connector 80 within the inner portion 302 of cavity 28, by securing (for example, threadedly) collar 84 of connector 80 within outer portion 34 of cavity 28.

In an exemplary implementation, threads 236 of male luer capping portion 200 can comprise female threads using a PosiFlush™ tip cap design for a male luer end, sufficient to interlock with a mating feature 86 of collar 84 of a male luer end, or connector, 80 to form a leak proof seal of cap 10 with connector 80. Such an exemplary implementation is applicable where connector 80 comprises a stopcock design to facilitate maintenance of pressure in an IV system when capped by cap 10.

In yet another exemplary implementation, side wall 206 of male luer capping portion 200 surrounds the exterior of collar 84 of connector 80 to protect the connection for example from bacteria by preventing direct skin to device contact where the cap 10 interacts with the luer lock 80.

According to yet further exemplary implementations of the embodiments of the disclosure, in a cap 10 described above with reference to FIGS. 3 through 7, at least a female luer capping portion 300 can be implements with various venting features and designs described in U.S. patent application Ser. Nos. 15/408,278 and 15/408,187, both filed on Jan. 17, 2017, for example by modifying shape and/or size and/or configuration (such as pitch, spacing, thickness, and/or other structural features) of thread 36 and/or configuration of surface 21.

While the present disclosure has been shown and described with reference to certain exemplary embodiments thereof, it will be understood by those skilled in the art that various changes in form and details may be made therein without departing from the spirit and scope of the embodiments of the present disclosure. For example, a disinfection sponge can comprise any suitable disinfecting or other application-specific substance, and can be made of any suitable material. Also, the inner and/or the outer housing of the cap can be single shot molded, or made by other suitable process. Furthermore, any of the features or elements of any exemplary implementations of the embodiments of the present disclosure as describes above and illustrated in the drawing figures can be implemented individually or in any combination(s) as would be readily appreciated by skilled artisans without departing from the spirit and scope of the embodiments of the present disclosure.

In addition, the included drawing figures further describe non-limiting examples of implementations of certain exemplary embodiments of the present disclosure and aid in the description of technology associated therewith. Any specific or relative dimensions or measurements provided in the drawings other as noted above are exemplary and not intended to limit the scope or content of the inventive design or methodology as understood by artisans skilled in the relevant field of disclosure.

Other objects, advantages and salient features of the disclosure will become apparent to those skilled in the art from the details provided, which, taken in conjunction with the annexed drawing figures, disclose exemplary embodiments of the disclosure.

I claim:

1. A cap comprising:
a housing comprising
  a sidewall,
  an open first end formed by said sidewall with a first opening to a first cavity within said housing for receiving a hub of a male needleless connector,
  an open second end formed opposite said first end by said sidewall with a second opening to a second cavity within said housing for receiving a hub of a female needleless connector, and
  a separation wall disposed within said sidewall, said separation wall comprising
    a first surface essentially perpendicular to a first portion of said sidewall extending from said separation wall to said first open end of said housing, said first surface forming a closed first end of said first cavity, and
    a second surface opposite said first surface and essentially perpendicular to a second portion of said sidewall extending from said separation wall to said second open end of said housing, said second surface forming a closed second end of said second cavity;
a protrusion within said first cavity, said protrusion comprising
  an inner surface defining an inner portion of said first cavity, said inner portion comprising an opening for receiving the hub of the male needleless connector in the inner portion,
  an outer surface of said inner portion of said first cavity, and
  an outer thread on said outer surface, said outer thread being sufficient to interlock with a mating feature of said male needleless connector forming a leak proof seal;
an outer portion of said first cavity, between said outer surface of said inner portion and said first portion of said sidewall, being sufficient to receive a collar of said male needleless connector when said outer thread of said protrusion interlocks with said mating feature of said male needleless connector; and
a first cover sealing said opening to the inner portion of said first cavity by attachment to a surface of a rim of said protrusion within said first cavity.

2. The cap of claim 1 further comprising:
an inner thread on an inner surface of said sidewall between said separation wall and said open second end,
wherein:
when said hub of said female needleless connector is received within said second cavity, said hub of said female needleless connector is secured within said second cavity by interlocking at least a portion of said inner thread with a mating feature on said hub of said female needleless connector.

3. The cap of claim 1, wherein:
when said hub of said male needleless connector is received within said first cavity, said hub of said male needleless connector is secured within said inner portion of said first cavity by interlocking at least a portion of said outer thread of said protrusion with said mating feature disposed on a collar of said male needleless connector when said collar is received within said first cavity.

4. The cap of claim 1, wherein:
said mating feature of said male needleless connector comprised a thread, and said protrusion comprises a full thread corresponding to said thread of said mating feature of said male needleless connector.

5. The cap of claim 1, wherein:
said protrusion extends essentially from said first surface of said separation wall toward said open first end of said housing.

6. The cap of claim 1, wherein:
said protrusion extends essentially parallel to said cylindrical sidewall.

7. The cap of claim 1, further comprising:
a second protrusion within said second cavity,
wherein:
when said hub of said female needleless connector is received within said second cavity, said second protrusion interfaces with an open end of said hub of said female needleless connector.

8. The cap of claim 7, wherein:
said second protrusion extends essentially from second surface of said separation wall toward said open second end of said housing.

9. The cap of claim 1, wherein:
said housing comprises an essentially cylindrical outer surface formed by an exterior of said cylindrical sidewall.

10. The cap of claim 1, further comprising any one, or any combination, of:
a first disinfection sponge configured within said inner portion of said first cavity;
a second disinfection sponge configured within said outer portion of said first cavity; and
a third disinfection sponge configured within said second cavity and a second cover sealing said open second end of said housing.

11. The cap of claim 1, wherein:
said sidewall is essentially cylindrical.

12. A capping method including interfacing with one or more connectors, wherein a cap includes
a housing comprising
a sidewall,
an open first end formed by said sidewall with a first opening to a first cavity within said housing for receiving a hub of a male needleless connector,
an open second end formed opposite said first end by said sidewall with a second opening to a second cavity within said housing for receiving a hub of a female needleless connector, and
a separation wall disposed within said sidewall, said separation wall comprising
a first surface essentially perpendicular to a first portion of said sidewall extending from said separation wall to said first open end of said housing, said first surface forming a closed first end of said first cavity, and
a second surface opposite said first surface and essentially perpendicular to a second portion of said sidewall extending from said separation wall to said second open end of said housing, said second surface forming a closed second end of said second cavity,
a protrusion within said first cavity comprising
an inner surface defining an inner portion of said first cavity, said inner portion comprising an opening for receiving a tip or hub of the male needleless connector in the inner portion,
an outer surface of said inner portion of said first cavity, and
an outer thread on said outer surface, said outer thread being sufficient to interlock with a mating feature of said male needleless connector forming a leak proof seal,
an outer portion of said first cavity, between said outer surface of said inner portion and said first portion of said sidewall, being sufficient to receive a collar of said male needleless connector when said outer thread of said protrusion interlocks with said mating feature of said male needleless connector,
an inner protrusion on an inner surface of said second portion of said sidewall for engaging a mating feature on said hub of said female needleless connector, and
a first cover sealing said opening to the inner portion of said first cavity by attachment to a surface of a rim of said protrusion within said first cavity,
said method comprising any one, or a combination, of:
removing said first cover before receiving a male needleless connector within said first cavity, or piercing said first cover before, or when, receiving said male needleless connector within said first cavity, and securing said hub of said male needleless connector within said inner portion of said first cavity by interlocking at least a portion of said outer thread of said protrusion with said mating feature disposed on a collar of said male needleless connector when said collar is received within said first cavity; and
receiving a hub of a female needleless connector within said second cavity, and securing said hub of said female needleless connector within said second cavity by interlocking at least a portion of said inner protrusion with said mating feature on said hub of said female needleless connector.

13. The method of claim 12 wherein:
said mating feature of said male needleless connector comprised a thread, and said protrusion comprises a full thread corresponding to said thread of said mating feature of said male needleless connector.

14. The method of claim 12, wherein:
said protrusion extends essentially from said first surface of said separation wall toward said open first end of said housing.

15. The method of 12, wherein:
said protrusion extends essentially parallel to said cylindrical sidewall.

16. The method of claim 12, further comprising:
a second protrusion within said second cavity,
wherein:
when said hub of said female needleless connector is received within said second cavity, said second protrusion interfaces with an open end of said hub of said female needleless connector.

17. The method of claim 16, wherein:
said second protrusion extends essentially from said second surface of said separation wall toward said open second end of said housing.

18. The method of claim 12, wherein:
said housing comprises an essentially cylindrical outer surface formed by an exterior of said cylindrical sidewall.

19. The method of claim 12, wherein said cap further includes any one, or any combination of
a first disinfection sponge configured within said inner portion of said first cavity,
a second disinfection sponge configured within said outer portion of said of said first cavity, and
a third disinfection sponge configured within said second cavity and a second cover sealing said open second end of said housing, the further comprising:
    removing said second cover sealing said open second end of said housing before said receiving said hub of said female needleless connector within said second cavity, or piercing said second cover before or when receiving said female needleless connector within said second cavity.
20. The method of claim 12, wherein:
said sidewall is essentially cylindrical.

* * * * *